US011182053B2

(12) United States Patent
Moehrle

(10) Patent No.: US 11,182,053 B2
(45) Date of Patent: *Nov. 23, 2021

(54) ACTIVE PATH MENU NAVIGATION SYSTEM

(71) Applicant: CADDO SYSTEMS, INC, Marshall, TX (US)

(72) Inventor: Armin Moehrle, Chicago, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 16/741,356

(22) Filed: Jan. 13, 2020

(65) Prior Publication Data

US 2020/0150834 A1    May 14, 2020

Related U.S. Application Data

(63) Continuation of application No. 15/434,052, filed on Feb. 15, 2017, now Pat. No. 10,969,934, which is a
(Continued)

(51) Int. Cl.
*G06F 3/0482* (2013.01)
*G06F 16/16* (2019.01)
*G06F 16/954* (2019.01)

(52) U.S. Cl.
CPC .......... *G06F 3/0482* (2013.01); *G06F 16/168* (2019.01); *G06F 16/954* (2019.01)

(58) Field of Classification Search
CPC .... G06F 3/0482; G06F 16/168; G06F 16/954; G06F 17/30126
See application file for complete search history.

(56) References Cited

U.S. PATENT DOCUMENTS 5,297,253 A * 3/1994 Meisel ............... G06F 16/34
715/854
5,801,702 A    9/1998 Dolan
(Continued)

FOREIGN PATENT DOCUMENTS

EP    0947921 A    10/1999
WO    0116482 A1    3/2001

OTHER PUBLICATIONS

Jason Cranford Teague, DHTML and CSS for the World Wide Web (2nd ed)., published 2001, Chapter 24, pp. 394, 399, 401. (Year: 2001).*

(Continued)

*Primary Examiner* — Eric J Yoon
(74) *Attorney, Agent, or Firm* — Jonathan D Feuchtwang

(57) ABSTRACT

A method for generating a plurality of graphical menu items for user selection, each graphical menu item having one or more sibling menu items, the one or more sibling menu items being on a first hierarchical level, at least one of the sibling menu items having one or more children menu items, the one or more children menu items being on a second hierarchical level different from the first hierarchical level; receiving user input selecting one or more graphical, sibling, or children menu items, wherein receiving user input includes receiving user input selecting one or more graphical, sibling, or children menu items in a sequence, and includes receiving user input selecting a graphical menu item followed by a sibling menu item and subsequently a children menu item; and constructing a graphical user interface that includes one or more selectable links arranged in accordance with the sequence, wherein constructing a selectable link for the graphical menu item followed by a selectable link for the sibling menu item and subsequently a selectable link for the children menu item, each selectable link corresponding to a selected graphical, sibling, or chil-
(Continued)

dren menu item and configured to: provide, in the graphical user interface, the one or more sibling menu items within the first hierarchical level or the one or more children menu items within the second hierarchical level.

17 Claims, 8 Drawing Sheets

Related U.S. Application Data continuation of application No. 13/725,681, filed on Dec. 21, 2012, now abandoned, which is a continuation of application No. 12/538,151, filed on Aug. 9, 2009, now Pat. No. 8,352,880, which is a continuation of application No. 11/687,646, filed on Mar. 17, 2007, now Pat. No. 7,725,836, which is a continuation of application No. 10/444,359, filed on May 23, 2003, now Pat. No. 7,216,301, which is a continuation-in-part of application No. 10/164,520, filed on Jun. 6, 2002, now Pat. No. 7,191,411.

(56) References Cited

U.S. PATENT DOCUMENTS

| | | | |
|---|---|---|---|
| 6,236,400 | B1 | 5/2001 | Guerrero |
| 6,240,410 | B1 | 5/2001 | Wical |
| 6,256,028 | B1 | 7/2001 | Sanford |
| 6,462,762 | B1 | 10/2002 | Ku |
| 6,597,377 | B1 | 7/2003 | MacPhail |
| 6,606,654 | B1 * | 8/2003 | Borman .......... H04L 29/06 707/999.101 |
| 6,621,532 | B1 | 9/2003 | Mandt |
| 6,633,316 | B1 | 10/2003 | Maddalozzo |
| 6,832,350 | B1 | 12/2004 | Bates |
| 6,990,638 | B2 | 1/2006 | Barksdale |
| 7,363,593 | B1 | 4/2008 | Loyens |
| 8,438,487 | B1 | 5/2013 | Hendel |
| 2003/0187912 | A1 * | 10/2003 | Kenyon .......... G06F 9/451 709/200 |
| 2004/0075693 | A1 | 4/2004 | Moyer |

OTHER PUBLICATIONS

Bowler D et al, Navigation Bars for Hierarchical Web Sites, Student HCI Online Research Experiments, Onine! 2001, pp. 1-23 XP002286023 University of Maryland, US.

RFC 1738 Dec. 1994, Internet RFC/STD/FYI/BCP Archives pp. 1-23.

Sun Microsystems Inc: "Quick Start to Using OpenStep Desktop", Online! Sep. 1996, XP00228624 pp. 5-1 to 5-9.

IBM: Fully Navigatable Breadcrumb Trails Research Disclosure, Keeth Mason Publications, Hampshire GB, vol. 46', No. 130, Sep. 2002, XP007131244, ISSN:0374-4353.

Website http://home.lu.lv/~mihails/tt1/P4_DynamicWeb/24-WebSiteNav/BreadCrumbs/ (implementation of the code disclosed in Teague Book Jason Cranford Teague, DHTML and CSS for the World Wide Web at 344 (2d ed.) published 2001 Chapter 24).

* cited by examiner

20 c:\windows\applications\temp\help.doc

22 http://www.uspto.gov/patents/applications http://www.uspto.gov/Patents/Patenting  v uspto.gov  >

| uspto.gov | > | About | |
| | | How to... | Services |
| | | Patents | Guides |
| | | Trademarks | Patenting |
| | | Check Status | International |
| | | | Resources |
| | | | Help |

~50

ACTIVE PATH MENU NAVIGATION SYSTEM

This application is a continuation of U.S. application Ser. No. 15/434,052 filed Feb. 15, 2017 which is a continuation of U.S. application Ser. No. 13/725,681 filed Dec. 21, 2012 which is a continuation of U.S. application Ser. No. 12/538,151 filed Aug. 9, 2009 (now U.S. Pat. No. 8,352,880) which is a continuation of U.S. application Ser. No. 11/687,646 filed Mar. 17, 2007 (now U.S. Pat. No. 7,725,836) which is a continuation of U.S. application Ser. No. 10/444,359 filed May 23, 2003 (now U.S. Pat. No. 7,216,301) which is a continuation-in-part (CIP) of U.S. application Ser. No. 10/164,520 entitled Active Path Menu Navigation System, filed Jun. 6, 2002 (now U.S. Pat. No. 7,191,411).

FIELD OF THE INVENTION

The present invention generally relates to a navigation system used to find, enter, or edit data or launch an application within a hierarchical information system. The navigation system of the present invention may be implemented in software executing on a standalone software program or on a client server application. More particularly, the navigation system of the present invention allows a user to access different levels in a hierarchical information system without retracing back to the top level of the hierarchy.

BACKGROUND OF THE INVENTION

Hierarchical information systems are used to organize items by function or theme in order to facilitate efficient locating of functions or locations. Hierarchical systems are used to organize documents into directories or folders and to organize functions into pull-down menus.

Conventionally one of two navigation systems are used to navigate through the various levels of a menu tree. By far the most popular menu navigation system is the so-called collapsing menu system which, for example, is used by many traditional personal computer applications. The distinguishing characteristics of this system are that the navigation always commences from the initial or root level and that the menu collapses back to the root level after a selection is made.

Computer software frequently includes dozens of functions. The sheer number of features makes it desirable to organize the functions into a hierarchy of categories to facilitate efficient searching. In a collapsing menu system, each level in the hierarchy is presented as a level in the pull-down menu.

FIG. 1A shows a top or root level 10 of a hypothetical menu. Each level 10 of the menu provides a list of menu choices 12. Each menu choice 12 could be an end node such as a function whose selection initiates some action, or the menu choice 12 could lead (point) to another level 10 providing a further list of menu choices 12. Selection of an end node will cause the pull-down menu to collapse back to the root level.

FIG. IB shows the pull-down menu of FIG. 1A with several levels of the hierarchical menu expanded. The menu structure of FIG. 1B collapses back to the root level shown in FIG. 1A once an end node is selected. The defining characteristic of such a conventional navigation system is that navigation is one-way, and always starts from the root level to an end node. This method of navigation becomes cumbersome if the desired function or destination is buried several levels down from the root directory.

To address this shortcoming, conventional operating systems such as Microsoft Windows® provide short-cuts in the form of pre-defined function keys or icons. Such short-cuts enable the user to directly access the desired function associated with the short-cut.

In the absence of a pre-defined short-cut, the user must resort to navigating the menu structure. The problem with the collapsing menu system is that navigation must always commence from the root level. Consequently, more experienced users are unable to take advantage of their knowledge of the hierarchical structure to directly access a given level.

FIG. 2A shows a conventional path menu system 20 used to navigate through the directory structure of a disk. Similarly, FIG. 2B shows a conventional universal resource locator (URL) command 22 which operates similarly to the DOS path command of FIG. 2A. The conventional disk operating system (DOS) uses a path menu system 20 to navigate between various folders. Each folder represents a different level in the hierarchy. A given folder may contain one or more sub-folders. To access a target or destination level the user must know the path, i.e., the names of the each of the folders from the root folder to the target folder. A system 10 of displaying the contents of each folder is provided to guide the user through the hierarchy. Namely, by typing a command such as DIRECTORY (DIR) the user is provided with the contents of the present folder and the path leading to the present folder. The user may proceed to a sub-level in the hierarchy or may retrace his/her steps to a preceding level by knowing the path.

Navigation using the path menu system requires the user to memorize and enter complex hierarchical sequences. This method of navigation is time consuming not suitable for users who have not memorized the path. Moreover, this method becomes extremely cumbersome as the number of levels increases.

Accordingly, one object of the present invention is to provide a more efficient way of navigating hierarchical menu systems.

SUMMARY OF THE INVENTION

A method for navigating within a multi-level hierarchical collapsing menu structure is disclosed. Each level in the menu structure contains plural items, each item representing a function such as the function of launching an application, accessing a database location, or pointing to a subordinate level.

The method of the present invention includes a step of providing a graphical user menu system displaying the items of a given level and enabling selection thereof, wherein access of the given level requires sequential access of each of the levels preceding the given level in the hierarchy. An Active Path is dynamically constructed as a sequence of active links as items are selected using the graphical user menu system, with one active link correspond to each of the items selected. The active links provide direct access to a function corresponding level or menu item without the need to navigate using the graphical user menu system.

According to a further aspect of the invention, pre-defined short-cuts are provided which enable direct access to a given menu item. The Active Path is dynamically constructed and displayed when one of the pre-defined short-cuts are executed, with one active link corresponding to each of the menu items necessary to access the given menu item using the graphical user menu system.

Navigation using the Active Path is accomplished by rolling over an active link with a pointing device or selecting an active link using a pointing device. Rolling over a given active link triggers the display of sibling menu items on the level associated with the given active link. Selecting a given active link triggers the execution of a function associated with the given active link.

These and other aspects of the present invention will be explained with reference to the drawings.

DETAILED DESCRIPTION OF THE PREFERRED EMBODIMENTS

Figure 1A:
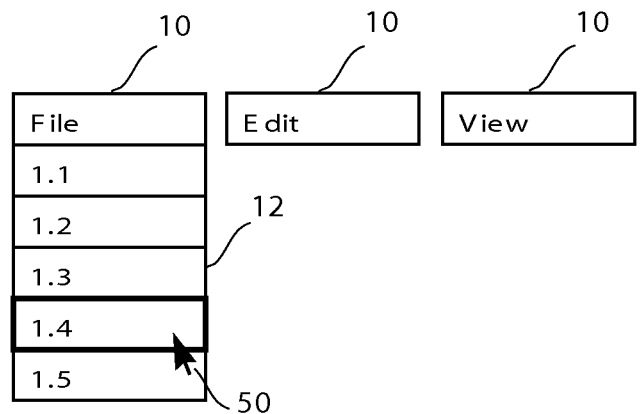
FIGS. 1A and IB are views of a conventional collapsing menu system.
Figure 1B:
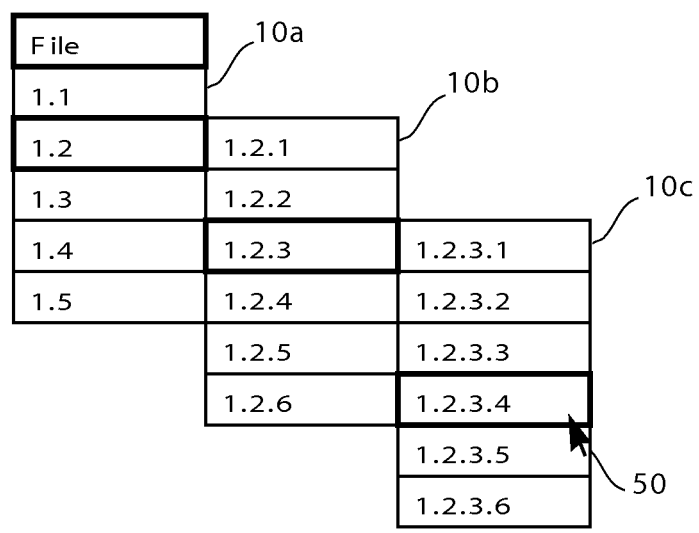
Figures 2A, 2B, 3:
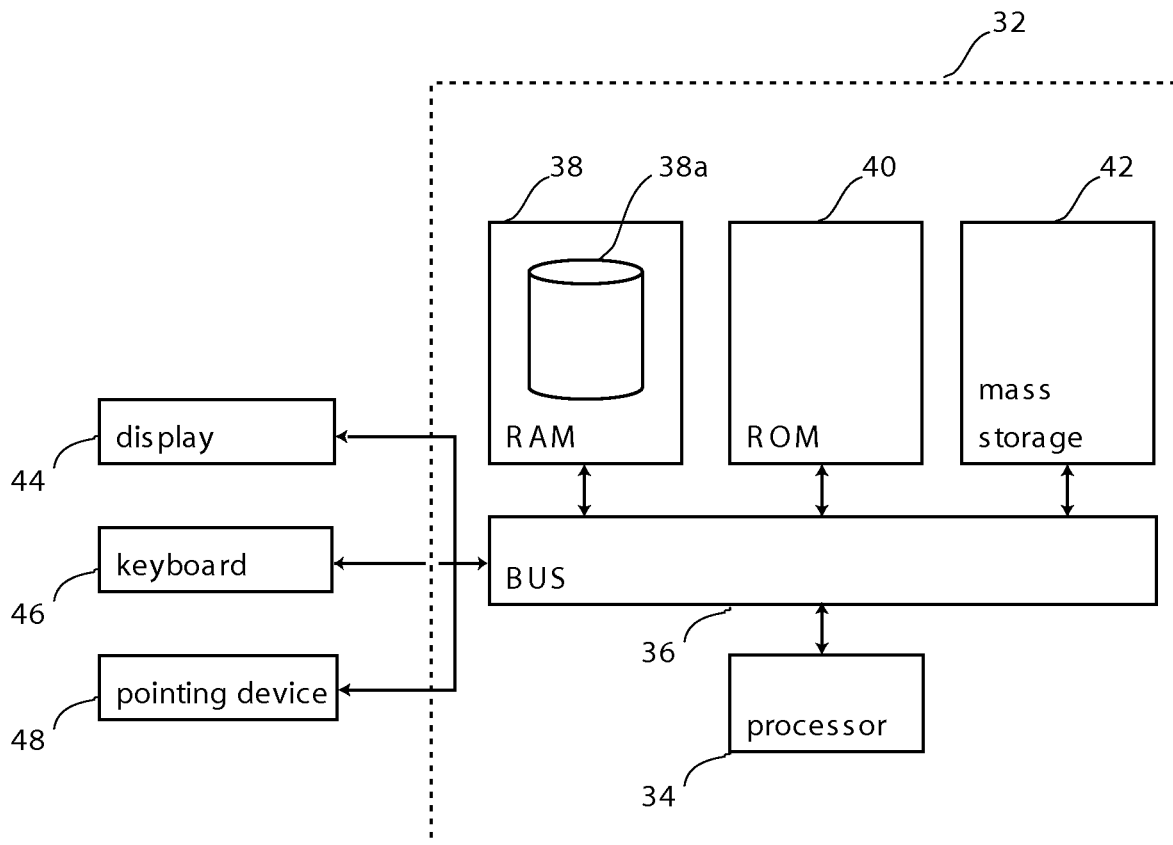
FIG. 2A is a view of a conventional path menu system.
FIG. 2B is a view of a conventional universal resource locator address.
FIG. 3 is a block diagram of a conventional computer architecture.

FIG. 3 is a block diagram of a computer 32 on which the software of the present invention operates. In the preferred embodiment, the main logic of the computer 32 is embodied by a general-purpose, programmable microprocessor 34, which in conventional practice will have an on-board memory cache (not shown) and which may be associated with one or more mathematics or other special-purpose coprocessors (not shown).

The processing logic generally represented by processor 34 is connected by a bus 20 structure 36 to the various other components of the computer 32. The schematic representation of bus 36 is shown in FIG. 3 as a simple and unitary structure, but in conventional practice, as is known to those in the art, there usually are several buses and communication pathways 36, operating at different speeds and having different purposes. Further, bus 36 may be segmented and controlled by respective bus controllers, as is also known in the art.

Computer 32 will also have a random access memory unit or units 38 connected to the bus 36. RAM 38 (which may be DRAM, SDRAM or other known types) typically has loaded into it the operating system of the computer 32 and executable instructions for one or more special applications designed to carry out the invention. Computer 32 also has electronic read-only memory 40 for storing those programs such as the BIOS which are non-volatile and persist after the computer 32 is shut down.

In alternative embodiments of the invention, one or more components of the invention's logic may be "hard-wired" into the ROM 40 instead of loaded as software instructions into RAM 38. ROM 40 can consist of or comprise electrically programmable read-only memory (EPROM), electrically erasable and programmable read-only memory (EE-PROM) of either flash or nonflash varieties, or other sorts of read-only memory such as programmable fuse or antifuse arrays.

In a typical architecture, a computer program suitable for carrying out the invention will be stored on a mass storage device 42, such as an optical disk or magnetic hard drive. Bus 36 connects mass storage device 42 to RAM 38. The computer 32 is connected to various peripheral devices used to communicate with an operator, such as display 44, keyboard 46, and pointing device (mouse) 48.

In operation, operating system software such as Microsoft Windows® executes on the computer 32, and the user interacts with the operating system using the display 44, keyboard 46, and pointing device (mouse) 48.

Figure 4A:
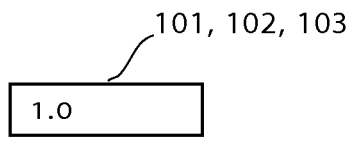
FIGS. 4A-4C are views showing how the Active Path of the present invention is assembled as the user browses and selects a menu item.

FIG. 4A shows the initial view of the Active Path menu system 100 of the present invention. In the initial view (FIG. 4A), the Active Path Active Path 100 comprises a single active link 102 termed a root link 101. Since the initial view includes only one active link 102, it is both the root link 101 and the end link 103.

Figure 4B:
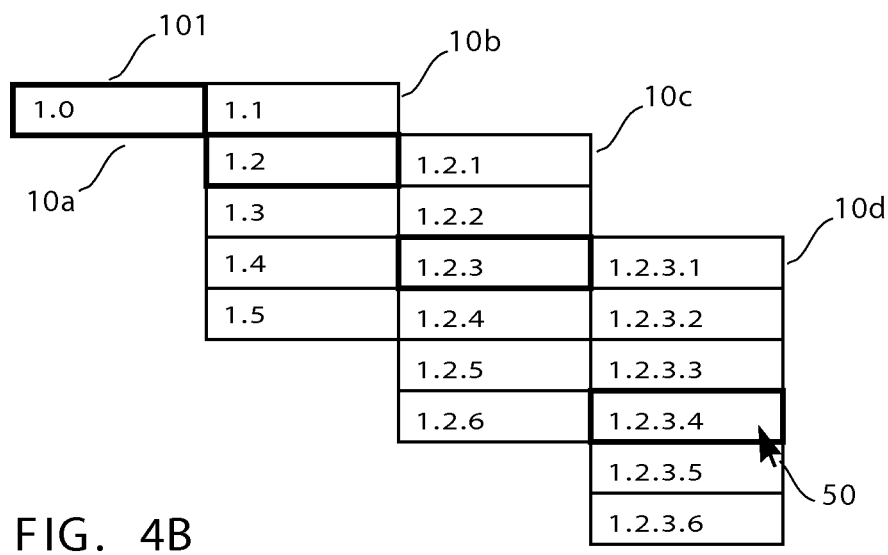
Figure 4C:
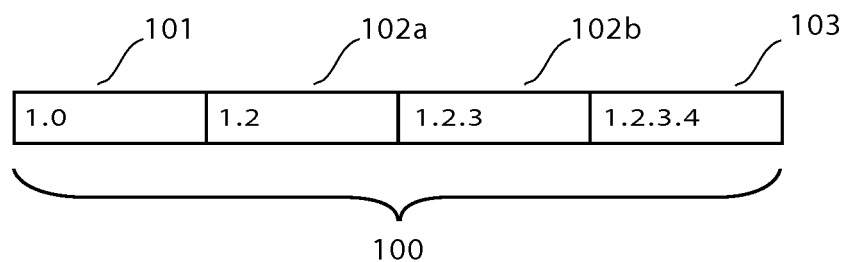

FIG. 4B shows how the user browses the hierarchical structure from the initial view (FIG. 10 4A) in order to arrive at an expanded view the Active Path 100 (FIG. 4C). Multiple hierarchical levels are displayed in FIG. 4B. Menu items 1.1, 1.2, 1.3 and 1.4 are termed siblings because they all fall within the same hierarchical level 10b. Moreover, menu items 1.1, 1.2, 1.3 and 1.4 are all hierarchically subordinate to root menu item 1.0. Similarly, menu item 1.2 is hierarchically superior to menu items 1.2.4.1, 1.2.4.2. Still further, menu item 1.0 is the parent 15 of menu items 1.1, 1.2, 1.3 and 1.4.

FIG. 4C is a view of an expanded Active Path Active Path 100 including active links 1.0, 1.2, 1.2.3, and 1.2.3.4.

The Active Path 100 consists of a sequential listing of active links 102, each active link 102 providing direct access to a corresponding level in the hierarchical structure and to all of the menu items on the same hierarchical level (sibling menu items).

It should be noted that whereas the conventional DOS path is merely a passive display of the hierarchical levels, the Active Path 100 is an interactive graphical user interface. As will become evident the Active Path 100 has several significant advantages over conventional menu trees used to navigate hierarchical information structures.

The Active Path 100 has distinct browsing and selection processes. The user browses by "rolling-over" (provisionally selecting) an element with a pointing device such as a mouse, causing the children to be displayed without hiding the siblings of the parent (and siblings of the grandparents etc). This quality of navigation supports the user's sense of orientation and is maintained until the user makes a selection.

As used herein, the term "selecting" IS distinguished from the term "browsing". Selecting means actively choosing a menu item. Using a conventional pointing device 48 such as a mouse, selection of a menu item (or active link) is accomplished when the user depresses and releases the mouse key (mouse-up operation).

Browsing means that the user has "rolled over" a menu item or active link 102 in order to view the siblings of the menu item or active link, i.e., all of the menu items on the same hierarchical level as the browsed link. The user may continue browsing the hierarchical data structure by browsing (rolling over) the sibling menu items. The Active Path 100 is not affected by the user's browsing. The displayed Active Path 102 changes only when the user selects a menu item or active link 102.

The present invention is not limited to any particular pointing device, and may be implemented in various ways without affecting the functionality of the invention. For example, separate mouse keys could be used for browsing and navigating.

The user may directly access any hierarchically superior level in the hierarchical data structure by selecting the corresponding active link 102. In other words, the user directly jumps to a given hierarchical level, and is not forced to sequentially navigate through each of the hierarchical levels of data structure to reach a desired level.

Referring to FIG. 4C, the user may directly access different hierarchical levels by selecting 101, 102*a*, 102*b*.

When the user selects any active link 102, the Active Path 100 responds by executing a function. Functions may include the launch of a software application or the display of the subordinate links with a detailed description.

The user may alternatively browse the Active Path 100 and any of the sibling menu items along a given branch in the data hierarchy. Browsing does not affect the active patch 100, which continues to be displayed until the user selects an active link 102 or one of the sibling menu items of an active link.

Moreover, the Active Path 100 enables the user to directly re-execute the last function without the need to navigate to the function through the menu system, and without the need for a pre-defined short-cut. This is accomplished by selecting the last active link (end link) 103.

In operation, the Active Path 102 starts with a special active link termed a root link 101 displayed (FIG. 4A). No other elements on the same or subordinate hierarchical level are displayed until the root link 101 is browsed (rolling over) or the expert user enters a shortcut to any point in the hierarchy.

FIG. 4B shows a user browsing the Active Path 100 shown in FIG. 4A. More 20 particularly, FIG. 4B shows the user browsing by rolling over the active link 1.2.3 resulting in the display of the siblings of 1.2.3.1, 1.2.3.2, 1.2.3.3, 1.2.3.6. Rolling over (browsing) an active link 102 results in the display of the siblings and children of the active link.

Figure 5A:
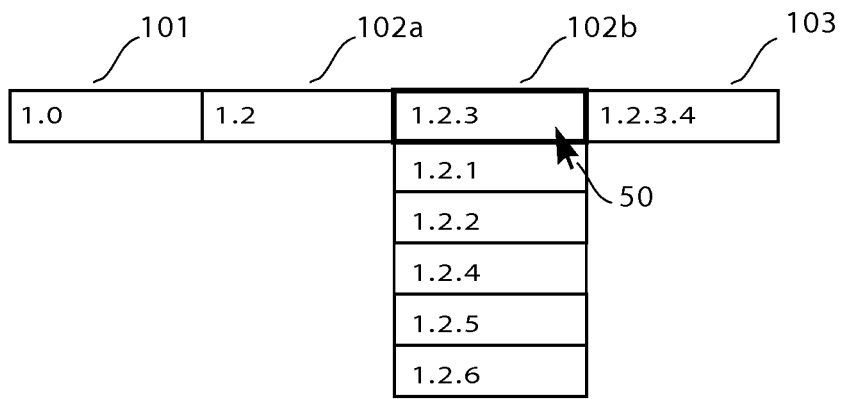
FIGS. 5A-5E are views showing how an active link is used to redirect the path.
Figure 5B:
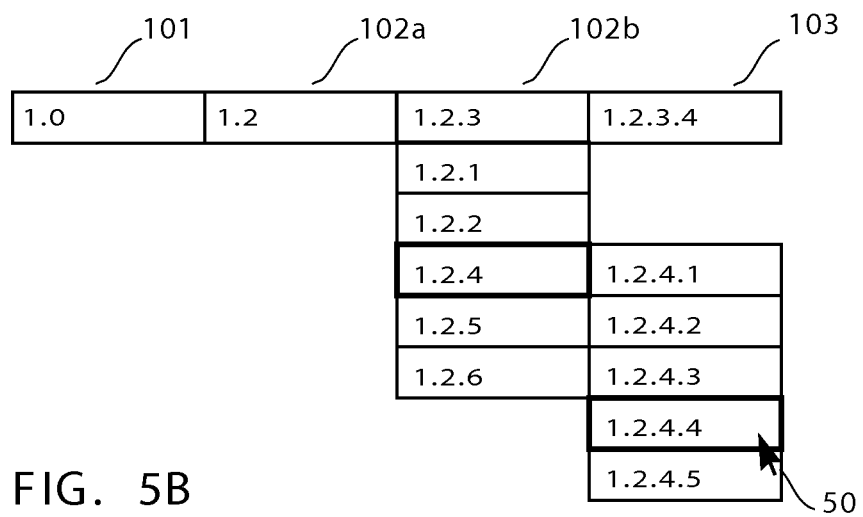

According to a preferred embodiment, there is a slight distinction between browsing an active link 102 and browsing a menu item. In browsing an active link 102, it is desirable to initially display only the siblings of the active link (FIG. 5A), and display the children after a slight time delay (FIG. 5B). The time delay in displaying the children of the browsed active link facilitates the user's sense of orientation.

Figure 5C:
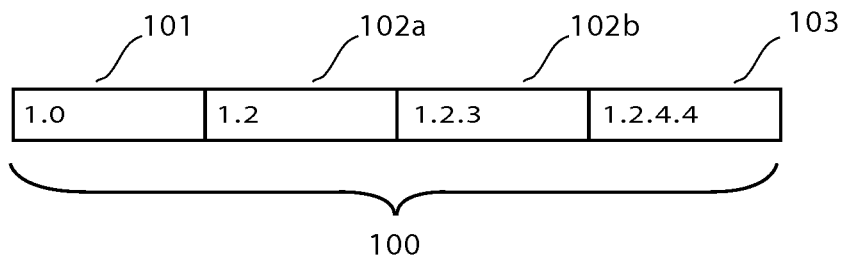

FIG. 5C shows the Active Path 100 created after the user selected 1.2.4.4 in FIG. 5B.

Another aspect of the invention relates to the user's ability to immediately re-execute the last executed function by selecting the end link 103. In this manner, the Active Path 100 defines on-the-fly a short-cut to the last function.

In contrast, conventional short-cuts such as a function keys, icons, or the like are static in that it only provides access to a single pre-defined item (function/database location).

In operation, the active links 102 of Active Path 100 are accessed using the mouse 48 and mouse buttons 48*a*, 48-*b* (FIG. 3).

As described above, each of the active links 102 in the Active Path 100 may be browsed 15 by rolling over the active link 102 with the pointer 50 of the pointing device 48, or accessed by selecting the active link 102. As shown in FIG. 5B rolling over the active link 102 simply entails manipulating the mouse 48 to position the software pointer 50 over the active link 102. Rolling over an active link 102-*b* causes the sibling menu items on the level corresponding the active link 102-*b* to be displayed. It should be noted that simply rolling over an active link 102 does not alter the Active Path 100; it merely causes the sibling menu items to be displayed.

Figure 5D:
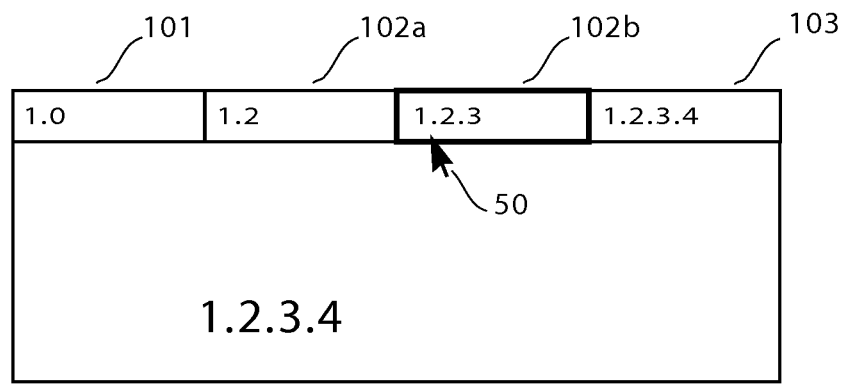
Figure 5E:
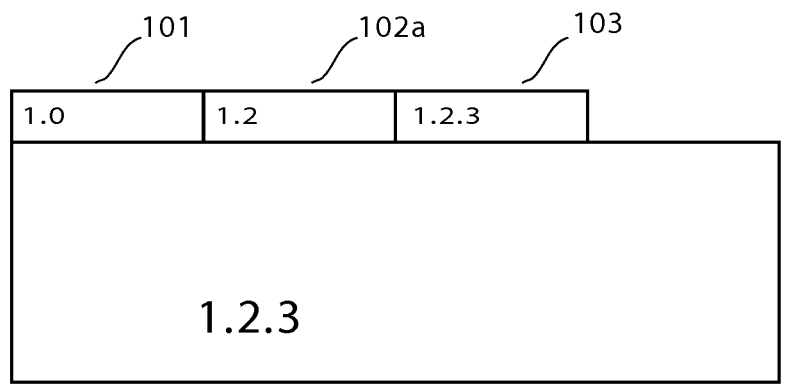

Selection of an active link 102 is accomplished by, for example, positioning the software pointer 50 over the active link 102 and actuating (and releasing) one of the mouse buttons 48-*a*, 48-*b*. Selection of an active link 102 causes different results depending on whether or not the selected active link 102 is the end link 103 in the Active Path 100. If the selected active link 102 is not the end link 103, then selection will cause a folder with subordinate levels and content to be displayed. For example, the folder may contain a list of the sibling menu items 12 (subordinate levels or links) on a given level of the hierarchical data structure, and a brief description (content) of each of the menu items. Moreover, if the selected active link 102 is not the end link 103, then selection will trigger the construction of a new Active Path 100. FIG. 5D shows a user selecting active link 102*b* (1.2.3). As shown, the last executed function (end link 103) was 1.2.3.4. After selecting 102*b* the Active Path is truncated, and 1.2.3 becomes the end link 103.

Selection of an end link 103 will cause the immediate re-execution of the associated function (last function executed). Thus, the last executed function may be re-executed by simply selecting the end link 103 in the Active Path 100. Moreover, selection of an end link 103 will not affect the Active Path 100.

According to a further aspect of the present invention, the Active Path 100 may be used to define a short-cut on-the-fly. Once the Active Path 100 has been constructed the user may store the end link 103 as a shortcut within a lookup table 38*a* (FIG. 3). According to a presently preferred embodiment, this is accomplished by a combination of commands. Thus, for example, the user could be prompted to define a short-cut identifier by clicking mouse button 48-*b* over end link 103. The Active Path 100 then stores the association between the function (or location) 20 and the user-selected shortcut in the rewriteable table 38*a*.

The Active Path 100 of the present invention may similarly be used to navigate to a location such as a location in a database or a web page. Notably, the Active Path 100 is created in the same manner regardless of whether the menu items 12 represent functions or locations. In the case of navigating to a location, selecting an active link: 102 (other than the end link: 103) triggers the access of the associated database location. In contrast, when navigating to a class of functions, selection of an active link: 102 (other than the end link: 103) merely triggers the display of the sibling menu items on the associated level. One of ordinary skill in the art will appreciate that the Active Path 100 of the present invention may be used in standalone applications such as operating systems, word processors, spreadsheets or the like. Moreover, the Active Path 100 may also be used in a client-server environment. Notably, the Active Path 100 may be used to navigate functions provided on a web site or to navigate between different web addresses.

In standalone applications, a range of Microsoft® Windows Application Programming Interface functions such as "CreateWindow" and other graphics library function calls may be used to create the graphic components of the Active Path. Any combination of mainstream programming languages such as Visual Basic, Java, C, or Delphi may be used to create the dynamic components and rollover effects.

In client server applications, the code for the Active Path may be part of the initial HTML file in form of a JavaScript/DHTML combination or separate JavaScript files (.js) containing the arrays describing the Active Path 100 and Cascading Style Sheets files (.css) containing the graphic attributes of the Active Path 100. This data may be cached locally after the initial server call.

For internet browser applications, such as Internet Explorer or Mozilla the preferred embodiment foresees a replacement of the address bar with the Active Path 100 to avoid redundancy, allow the user to focus on the content and make browsing more efficient. For Microsoft® Internet Explorer, this would involve utilizing its custom Explorer Bars integration feature.

In standalone applications, a range of Windows Application Programming Interface functions such as "CreateWindow" and other graphics library function calls may be used to create the graphic components of the Active Path. Any combination of mainstream programming languages such as Visual Basic, Java, C, or Delphi may be used to create the dynamic components and rollover effects.

Windows Explorer may replace the Address Bar with the Active Path 100. This could make the display of the folder window redundant. The user may better take advantage of the screen real-estate by rolling over and "browsing" through the levels of the collapsing menu system.

The Active Path 100 of the present invention may also be used to navigate audio interfaces. A preferred embodiment for audio interfaces would allow users to navigate to the end point of a path. A certain input command, such as pressing a certain key, would read the sequence and level of the selected path. Users can then select any level of the path and navigate to a new endpoint.

The Active Path 100 may also be used in conjunction with a conventional navigation system such as the above-described collapsing menu system or path menu system.

The Active Path 100 is dynamically assembled and displayed as the user navigates using the conventional menu screens. The Active Path 100 is assembled automatically without the need for any additional user interaction as the user navigates using the collapsing menu system.

Figure 6A:
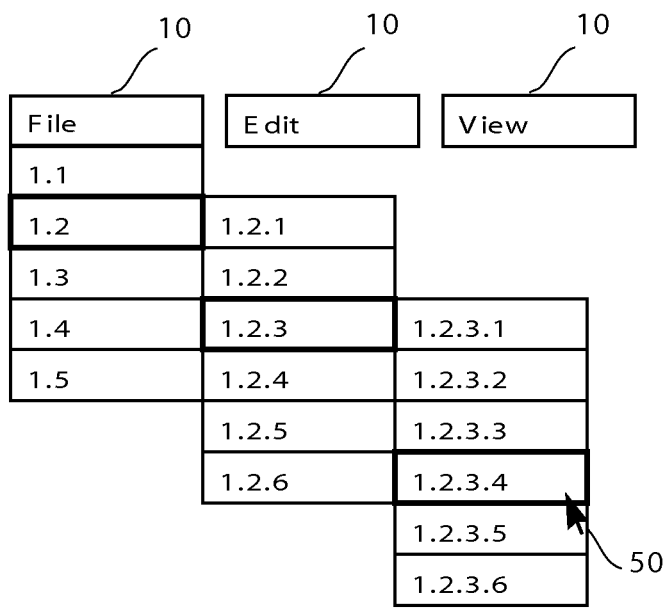
FIGS. 6A-6B are views showing the Active Path in combination with a traditional menu system to support the user's sense for orientation.
Figure 6B:
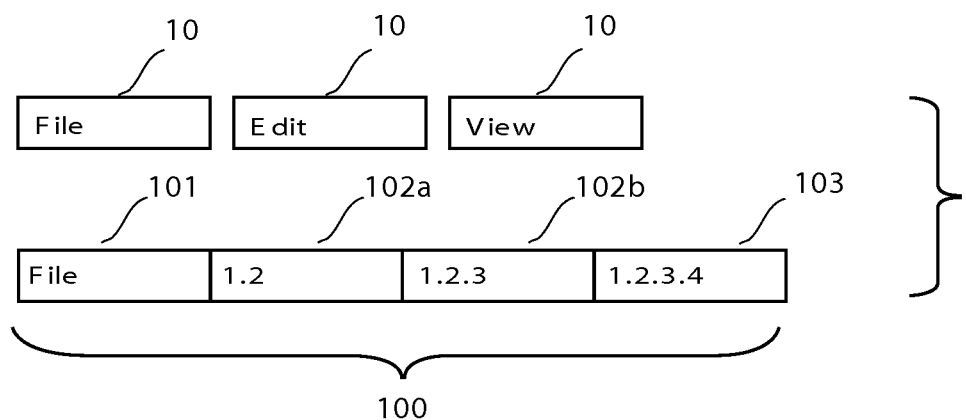

FIGS. 6A-6B show how the Active Path 100 may be used to navigate to classes of functions. In the embodiment depicted in FIGS. 6A-6B the Active Path 100 is used in conjunction with a conventional collapsing menu system 10. One of ordinary skill in the art will appreciate that the location of the Active Path 100 in relation to the collapsing menu system 10 and its graphical representation are not critical to the operation of the Active Path 100.

FIG. 6A shows an initial view of the conventional collapsing menu system 10. The Active path 100 is absent from FIG. 6A because no menu item has been selected. As the user rolls over a given menu item, the children of the menu item are displayed. In FIG. 6A the user has successively rolled over 1.2, 1.2.3, and 1.2.3.4. Again, the Active path 100 is absent from FIG. 6A because no menu item has yet been selected.

FIG. 6B shows the Active Path 100 after the user selected menu item 1.2.3.4. As shown, the conventional collapsing menu system collapses once the user has selected a menu item. Each active link 102 in the Active Path 100 represents the sequence of implicit selections by an explicit selection of the menu item. More particularly, the Active Path 100 shown in FIG. 6A includes active links 101, 102*a*, 102*b*, and 103 corresponding to menu items FILE, 1.2, 1.2.3, and 1.2.3.4. Active link 101 corresponds to menu item FILE selected from the initial or root level. Likewise, active link 102-*a* corresponds to menu item 1.2 selected, and active link 102-*b* corresponds to menu item 1.2.3. Construction of the Active Path 100 occurs automatically as the user navigates through the menu system 10. It should be noted that active link 102-*c* is the end link 103 in the Active Path 100.

It should be noted that the menu system (pull-down menu tree) 10 collapses when the user selects end node 1.2.3.4 whereupon the Active Path 100 appears. The user may directly access different hierarchical levels simply by selecting different active links 102.

As described above, the Active Path 100 is dynamically constructed as the user navigates the collapsing menu system, and is subsequently retained after the menu tree collapses back to the root level. In addition, the Active Path 100 may optionally be constructed each time a short-cut such as a function key or the like is used. It should be noted that a shortcut may be defined for any point in the hierarchical structure. This requires the use of a look-up table 38*a* (FIG. 3) stored in RAM 38. The look-up table 38*a* stores each of the pre-defined shortcuts and the associated data necessary to create the Active Path 100. According to a presently preferred embodiment, the Active Path 100 constructed is the same as would be constructed by accessing the function through the collapsing menu system.

In operation, the look-up table 38*a* would originally be created by the software developer during initial definition of each of the pre-defined short-cuts (function keys). Moreover, as will be explained, the look-up table 38*a* may be updated by the user to reference newly created short-cuts.

Additional Pointers on Menu Item

A further aspect of the invention will now be described with reference to FIGS. 7A-7C. Each menu item may contain additional pointers to functions such as a search entry field 200 used for searching folders, files or content of the subordinate information hierarchy.

Figure 7A:
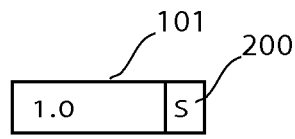
FIGS. 7 A-7C are views showing the Active Path with search functionality for subordinate layers and content.

FIG. 7A shows an initial (root level) view of the Active Path 100 with root link 101, and the search field 200. Selecting search field 200 in FIG. 7A will enable the user to search the entire hierarchical structure from the highest (root) level to the lowest level.

Figure 7B:
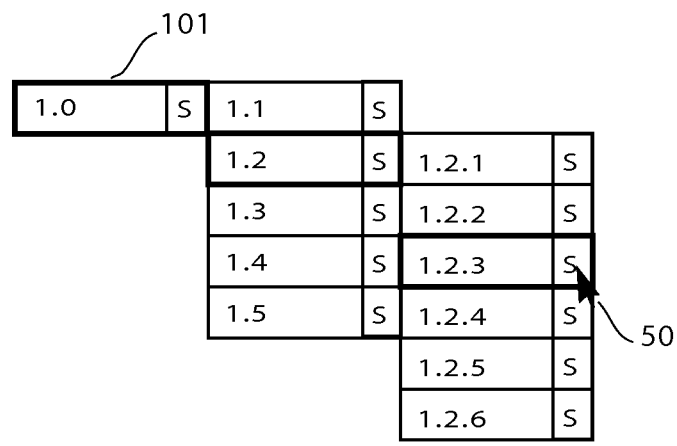

FIG. 7B shows an expanded view of the Active Path 100. Selecting search field 200 in FIG. 7B will enable the user to search the hierarchical structure from 1.2.3 and all hierarchically subordinate levels (along the same branch).

Figure 7C:
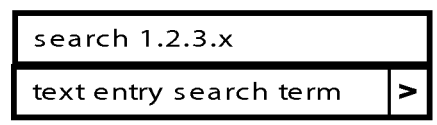

FIG. 7C shows a sample of the search entry interface displayed when the user selects the search field 200.

The functionality of the search entry field 200 may also be implemented by, for example, using a special button on the pointing device 48 or special key stroke on the keyboard.

As noted above, the Active Path 100 of the present invention may be used to navigate directories, with the internet being just one example of a directory.

Moreover, the Active Path may be used to enhance the functionality of the address bar in an internet browser such as Internet Explorer or Mozilla.

Figures 8A, 8B, 8C, 8D:
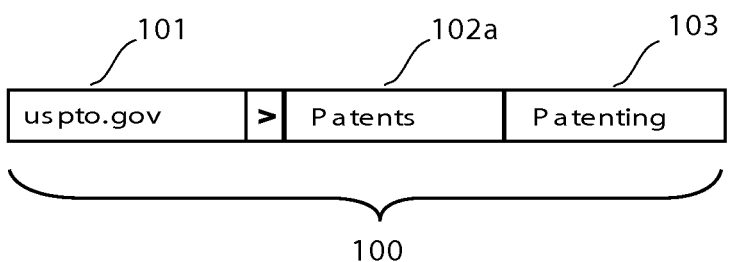
FIGS. 8A-8D are views showing the Active Path replacing the address bar in a browser.

FIG. 8A shows a conventional address bar of an internet browser.

FIG. 8B shows the root level 101 of the Active Path 100 as a text entry field. Once a user has entered a location (destination) the Active Path 100 will search for a data file representing the information hierarchy of the location. This data file will enable the user to browse the entire information hierarchy of the location without fetching additional information from the server each time a new hierarchical level is browsed. This enables a user to quickly locate and directly access the desired (content) level with the hierarchy without having to sequentially access the various levels of the hierarchy.

FIG. 8C shows a user browsing an information hierarchy. This aspect of the Active Path does not require the user to memorize the entire URL to access a location. Moreover, the data file merely contains a representation of the structure of the information hierarchy and does not contain the actual contents of the location. For this reason, the data file is relatively small. Once the user has accessed a given location (FIG. 8D), the Active Path 100 includes a series of active links 101, 102, 103 each active link pointing to a different level in the hierarchical structure. The user may then directly access any level along the path without having to resort to pressing the "go back" button on the browser.

If a data file representing the information hierarchy of the location is not located, the Active Path Menu Navigation System will dynamically create the file from the directory structure and the hypertext markup language (HTML) available on the server and client files.

According to another aspect of the invention, the Active Path 100 may be used to as a method for navigating web sites including a plurality of hierarchically organized web pages. The method of the present invention eliminates the need for providing hyperlinks and navigational elements on the individual web pages.

According to the present invention, a data file representing the hierarchical structure of the multi-level hierarchical website is either constructed or retrieved from the server. As noted above, the data file representing the information hierarchy of the location may be dynamically created from the directory structure and the hypertext markup language (HTML) available on the server and client files.

Using the Active Path, the user browses the data file representing the information hierarchy of the location, and selects a desired location. This eliminates the need to provide hyperlinks and navigational elements on the individual web pages.

A new Active Path is dynamically constructed each time the user navigates to a new location (web page) within the hierarchical website. Again, each active link corresponds to a level in the hierarchical structure, and a user may directly access any given level of the hierarchical structure by selecting a given active link. Moreover, the active links provide the user the ability to directly browse all items on any given level of the hierarchical menu structure including all hierarchically subordinate items without affecting the Active Path.

Although a preferred embodiment of the Active Path navigation system of the present invention has been specifically described and illustrated, it is to be understood that variations or alternative embodiments apparent to those skilled in the art are within the scope of this invention. Since many such variations may be made, it is to be understood that within the scope of the following claims, this invention may be practiced otherwise than specifically described.

The invention claimed is:

1. A method comprising:
generating a plurality of graphical menu items for user selection, each graphical menu item having one or more sibling menu items, the one or more sibling menu items being on a first hierarchical level, at least one of the sibling menu items having one or more children menu items, the one or more children menu items being on a second hierarchical level different from the first hierarchical level;
receiving user input selecting one or more of the graphical, sibling, or children menu items, wherein receiving user input includes receiving user input selecting one or more of the graphical, sibling, or children menu items in a sequence, and includes receiving user input selecting a graphical menu item of the one or more graphical menu items followed by a sibling menu item of the one or more sibling menu items and subsequently a children menu item of the one or more sibling menu items; and
in response to receiving the user input, constructing a graphical user interface that includes one or more selectable links arranged in accordance with the sequence, the one or more selectable links including a first, second and third selectable link, wherein constructing the graphical user interface comprises constructing the first selectable link for the selected graphical menu item followed by constructing the second selectable link for the selected sibling menu item and subsequently constructing the third selectable link for the selected children menu item, each of the one or more selectable links representing one of the selected graphical, sibling, or children menu item and configured to:
in response to selection of the selectable link, display at least one menu item of the plurality of graphical menu items, the one or more sibling menu items, or the one or more children menu items, wherein the at least one displayed menu item is in the same hierarchical level as the selected graphical, sibling or children menu item represented by the selectable link;
provide, in the graphical user interface, the one or more sibling menu items within the first hierarchical level or the one or more children menu items within the second hierarchical level, and
enable selection, via the graphical user interface, of the one or more sibling menu items within the first hierarchical level or the one or more children menu items within the second hierarchical level.

2. The method of claim 1, wherein constructing the graphical user interface includes:
constructing the one or more selectable links each providing a navigational shortcut to a corresponding graphical, sibling, or children menu item; and
enabling selection, via the graphical user interface, of the navigational shortcut to the corresponding graphical, sibling, or children menu item.

3. The method of claim 1, wherein constructing the graphical user interface includes constructing each selectable link of the one or more selectable links as user inputs selecting a graphical, sibling, or children menu item are received.

4. The method of claim 1, further comprising:
determining a sibling menu item corresponding to the selected children menu item,
wherein constructing the graphical user interface includes constructing a selectable link for each of the selected graphical menu item, the determined sibling menu item, and the selected children menu item.

5. The method of claim 1, further comprising:
receiving user input selecting the selectable link associated with the selected graphical menu item; and
updating the sequence of selectable links by removing the selectable links sequentially following the selected selectable link in response to receiving the user input selecting the selectable link associated with the selected graphical menu item.

6. The method of claim 1, further comprising:
receiving user input selecting the second selectable link; and
updating a sequence of the one or more selectable links by removing selectable links sequentially following the selected second selectable link in response to receiving the user input selecting the second selectable link.

7. The method of claim 1, wherein:
receiving user input includes receiving user input selecting a first graphical menu item followed by a first sibling menu item, the first graphical menu item having a hierarchical structure containing the first sibling menu item; and
constructing the graphical user interface includes constructing a fourth selectable link associated with the selected first graphical menu item and a fifth selectable link associated with the selected first sibling menu item, the fourth selectable link configured to display the selected first sibling menu item within a hierarchical structure associated with the selected first graphical menu item and the fifth selectable link configured to display one or more corresponding children menu items within a hierarchical structure associated with the selected first sibling menu item.

8. A method comprising:
generating a first menu item for user selection via an interface, the first menu item having a first set of menu items, the first set of menu items being on a first hierarchical level of a hierarchical structure, at least a menu item in the first set of menu items having a second set of one or more menu items, the second set of one or more menu items being on a second hierarchical level of the hierarchical structure, the second hierarchical level being different from the first hierarchical level;
receiving user input selecting the first menu item, a menu item in the first set, and a menu item in the second set, wherein receiving user input includes receiving user input selecting one or more graphical, sibling, or children menu items in a sequence,
wherein selecting one or more graphical, sibling, or children menu items in the sequence includes receiving user input selecting a graphical menu item followed by a sibling menu item and subsequently a children menu item;
in response to receiving the user input selecting the first menu item, the menu item in the first set, and the menu item in the second set, constructing a graphical user interface that includes a first selectable link providing a first navigational shortcut to the selected first menu item, a second selectable link providing a second navigational shortcut to the selected menu item in the first set, and a third selectable link providing a third navigational shortcut to the selected menu item in the second set; and
in response to selecting one of the second and third selectable links, display at least one menu item of the first set of menu items or the second set of menu items wherein the second and third selectable links respectively represent the selected menu item in the first set and the selected menu item in the second set and wherein the at least one menu item is in the same hierarchical level as the menu item represented by the selected one of the selectable links;
wherein constructing the graphical user interface includes constructing the graphical user interface such that the graphical user interface includes one or more of the first, second and third selectable links arranged in accordance with the sequence; and
wherein constructing the graphical user interface includes constructing a selectable link for the graphical menu item followed by a selectable link for the sibling menu item and subsequently a selectable link for the children menu item.

9. The method of claim 8, wherein constructing the graphical user interface includes:
constructing the second selectable link providing the second navigational shortcut to one or more menu items in the first set in addition to the selected menu item in the first set; and
constructing the third selectable link providing the third navigational shortcut to one or more menu items in the second set in addition to the selected menu item in the second set.

10. The method of claim 9, wherein the second selectable link is configured to display the first set of menu items including the selected menu item in the first set when a pointer is positioned over the second selectable link.

11. The method of claim 9, wherein the third selectable link is configured to display the second set of one or more menu items including the selected menu item in the second set when a pointer is positioned over the third selectable link.

12. The method of claim 8, wherein:
receiving user input includes receiving user input selecting the first menu item, the menu item in the first set, and the menu item in the second set in a sequence; and
constructing the graphical user interface includes constructing the first selectable link, the second selectable link and the third selectable link in accordance with the sequence in which the first menu item, the menu item in the first set, and the menu item in the second set are selected.

13. The method of claim 8, further comprising:
receiving user input selecting the second selectable link providing the second navigational shortcut to the selected menu item in the first set; and
updating a sequence of selectable links by removing the third selectable link from the graphical user interface in response to receiving user input selecting the second selectable link.

14. The method of claim 8, further comprising:
receiving user input selecting the first selectable link providing the first navigational shortcut to the selected first menu item; and
updating a sequence of selectable links by removing the second selectable link and the third selectable link in response to receiving user input selecting the first selectable link.

15. The method of claim 8, wherein at least one of the first menu item, the first set of menu items, or the second set of one or more menu items, when selected, is configured to execute a function comprising one of launching an application, accessing a database location, or pointing to a menu item within the hierarchical structure.

16. A method comprising:
generating a plurality of graphical menu items for user selection, each graphical menu item having one or more sibling menu items, the one or more sibling menu items being on a first hierarchical level, at least one of the sibling menu items having one or more children menu items, the one or more children menu items being on a second hierarchical level different from the first hierarchical level;

receiving user input selecting one or more of the graphical, sibling, or children menu items, wherein receiving the user input includes receiving user input selecting a graphical menu item of the plurality of graphical menu items followed by a sibling menu item of the one or more sibling menu items followed by a children menu item of the one or more children menu items; and in response to the receiving user input, constructing a graphical user interface that includes one or more selectable links, each of the selectable links representing one of the selected graphical, sibling, or children menu item and configured to:

provide, in the graphical user interface, the one or more sibling menu items within the first hierarchical level or the one or more children menu items within the second hierarchical level, enable selection, via the graphical user interface, of the one or more sibling menu items within the first hierarchical level or the one or more children menu items within the second hierarchical level;

in response to selection of the selectable link, display at least one menu item of the plurality of graphical menu items, the one or more sibling menu items, or the one or more children menu items, wherein the at least one displayed menu item is in the same hierarchical level as the selected graphical, sibling or children menu item represented by the selectable link;

determining a sibling menu item corresponding to the selected children menu item;

wherein constructing the graphical user interface includes constructing a selectable link for each of the selected graphical menu item, the determined sibling menu item, and the selected children menu item.

17. A method comprising:

generating a plurality of graphical menu items for user selection, each graphical menu item having one or more sibling menu items, the one or more sibling menu items being on a first hierarchical level, at least one of the sibling menu items having one or more children menu items, the one or more children menu items being on a second hierarchical level different from the first hierarchical level;

receiving user input selecting one or more graphical, sibling, or children menu items of the plurality of graphical menu items, the one or more sibling menu items and the one or more children menu items, respectively, the receiving user input including receiving user input selecting a first graphical menu item of the plurality of graphical items followed by a first sibling menu item of the one or more sibling menu items, the first graphical menu item having a hierarchical structure containing the first sibling menu item; and in response to the receiving user input selecting the one or more graphical, sibling or children menu items, constructing a graphical user interface that includes one or more selectable links including first and second selectable links, each selectable link representing a selected graphical, sibling, or children menu item of the plurality of graphical menu items, the one or more sibling menu items and the one or more children menu items, respectively, wherein the constructing further comprises constructing the first selectable link representing the selected first graphical menu item and the second selectable link representing the selected first sibling menu item, the first selectable link configured to display the selected first sibling menu item within a hierarchical structure associated with the selected first graphical menu item and the second selectable link configured to display at least one corresponding children menu item of the one or more children menu items within a hierarchical structure associated with the selected first sibling menu item, wherein each of the one or more selectable links is configured to display at least one menu item of the plurality of graphical menu items, the one or more sibling menu items, or the one or more children menu items, wherein the at least one displayed menu item is in the same hierarchical level as the selected graphical, sibling or children menu item represented by the selectable link and wherein the graphical user interface is configured to:

provide, in the graphical user interface, the one or more sibling menu items within the first hierarchical level or the one or more children menu items within the second hierarchical level, and enable selection, via the graphical user interface, of the one or more sibling menu items within the first hierarchical level or the one or more children menu items within the second hierarchical level.

\* \* \* \* \*

UNITED STATES PATENT AND TRADEMARK OFFICE
CERTIFICATE OF CORRECTION

| | |
|---|---|
| PATENT NO. | : 11,182,053 B2 |
| APPLICATION NO. | : 16/741356 |
| DATED | : November 23, 2021 |
| INVENTOR(S) | : Armin Moehrle |

It is certified that error appears in the above-identified patent and that said Letters Patent is hereby corrected as shown below:

In the Claims

Column 10, Line 25 delete "the selectable link" and insert --one of the selectable links--;
Column 10, Line 31 delete "selectable link" and insert --selected one of the selectable links--;
Column 13, Line 21 delete "the selectable link" and insert --one of the selectable links--;
Column 13, Line 27 delete "the selectable link" and insert --one of the selectable links--; and
Column 14, Lines 34-35 delete "the selectable link" and insert --one of the selectable links--.

Signed and Sealed this
Twenty-first Day of March, 2023

Katherine Kelly Vidal
*Director of the United States Patent and Trademark Office*